United States Patent [19]
Gasca et al.

[11] Patent Number: 5,910,461
[45] Date of Patent: Jun. 8, 1999

[54] GLASS FIBERS FOR REINFORCING ORGANIC MATERIALS, AND COMPOSITES OBTAINED THEREBY

[75] Inventors: Jean-Philippe Gasca, Saint-Jean de la Porte; Michel Arpin, La Motte Servolex; Denis Malgrange, Courbevoie; Daniel Caurant, Epinay, all of France

[73] Assignee: Vetrotex France, Chambery, France

[21] Appl. No.: 08/980,356

[22] Filed: Nov. 28, 1997

Related U.S. Application Data

[63] Continuation of application No. 08/404,439, Mar. 15, 1995, abandoned.

[30] Foreign Application Priority Data

Mar. 15, 1994 [FR] France ................................ 94 02973

[51] Int. Cl.$^6$ ............................................. C03C 13/00
[52] U.S. Cl. .............................. 501/35; 501/36; 501/65; 501/66; 501/71; 106/711
[58] Field of Search .................. 501/35, 36, 65, 501/66, 57, 4, 37, 71; 106/711; 428/288

[56] References Cited

U.S. PATENT DOCUMENTS

| | | | |
|---|---|---|---|
| 2,571,074 | 10/1951 | Tiede ......................................... | 106/50 |
| 2,748,028 | 5/1956 | Richardson .............................. | 117/126 |
| 3,466,180 | 9/1969 | Hagedorn et al. ........................ | 501/70 |
| 3,966,481 | 6/1976 | Atkinson et al. ........................ | 106/711 |
| 4,066,466 | 1/1978 | Neely, Jr. . | |
| 4,090,882 | 5/1978 | Rauschenfels ........................... | 106/711 |
| 4,090,883 | 5/1978 | Rauschenfels ........................... | 106/711 |
| 4,102,692 | 7/1978 | Schartau et al. ........................ | 106/711 |
| 4,205,992 | 6/1980 | Mogensen et al. ...................... | 106/711 |
| 4,304,604 | 12/1981 | Daerr et al. .............................. | 106/711 |
| 4,339,541 | 7/1982 | Dela Ruye ................................ | 501/71 |
| 4,363,878 | 12/1982 | Yamamoto et al. ...................... | 501/36 |
| 4,534,796 | 8/1985 | Massol .................................... | 501/38 |
| 4,771,019 | 9/1988 | Sproull .................................... | 501/37 |
| 4,882,302 | 11/1989 | Horiuchi et al. ......................... | 501/27 |
| 5,023,210 | 6/1991 | Krumwiede et al. . | |
| 5,030,593 | 7/1991 | Heithoff ................................... | 501/71 |
| 5,070,045 | 12/1991 | Comte et al. ............................. | 501/4 |
| 5,250,488 | 10/1993 | Thelohan et al. ........................ | 501/63 |
| 5,256,600 | 10/1993 | Pfitzenmaier ............................. | 501/4 |
| 5,346,868 | 9/1994 | Eschner .................................... | 501/95 |
| 5,364,820 | 11/1994 | Morimoto et al. ....................... | 501/71 |
| 5,478,783 | 12/1995 | Higby et al. .............................. | 501/71 |

FOREIGN PATENT DOCUMENTS

| | | |
|---|---|---|
| 0 074 655 | 3/1983 | European Pat. Off. . |
| 0 186 077 | 7/1986 | European Pat. Off. . |
| 0 536 049 | 4/1993 | European Pat. Off. . |
| 0 565 882 | 10/1993 | European Pat. Off. . |
| 0 582 808 | 2/1994 | European Pat. Off. . |
| 2 650 268 | 2/1991 | France . |
| 2 692 248 | 12/1993 | France . |
| 1121046 | 7/1966 | United Kingdom . |
| 1 200 732 | 7/1970 | United Kingdom . |
| 1 494 408 | 12/1977 | United Kingdom . |
| 2 071 081 | 9/1981 | United Kingdom . |
| 2 124 202 | 2/1984 | United Kingdom . |

OTHER PUBLICATIONS

Derwent Abstract of EP–A–0 536 049, Apr. 7, 1993.
Derwent Abstract of FR–A–2–650 268, Jan. 2, 1991.
Derwent Abstract of EP–A–0 186 077, Feb. 7, 1986.
Derwent Abstract of BE–848490, May 18, 1977.
Derwent Abstract of FR 2 692 248, Dec. 1993.
Database WPI, Derwent Publications, AN 93–164194, JP 5–097480, Apr. 20, 1993.
Database WPI, Derwent Publications, AN 90–14308, SU 1470694, Apr. 7, 1989.
Database WPI, Derwent Publications, AN 87–333605, SU 1303571, Apr. 15, 1987.

*Primary Examiner*—Karl Group
*Attorney, Agent, or Firm*—Oblon, Spivak, McClelland, Maier & Neustadt, P.C.

[57] ABSTRACT

The present invention relates to glass fibers, especially for reinforcing organic materials and having an alumino-silicate glass composition, containing one or more alkaline earth metal compounds and with a low content of alkali metal compounds, wherein the composition further contains a combination of coloring agents formed from iron oxides, cobalt oxide and, optionally, chromium oxide, which enable the fibers to be dyed in bulk and to have more neutral tones.

26 Claims, No Drawings

GLASS FIBERS FOR REINFORCING ORGANIC MATERIALS, AND COMPOSITES OBTAINED THEREBY

This application is a continuation of application Ser. No. 08/404,439, filed Mar. 15, 1995, now abandoned.

BACKGROUND OF THE INVENTION

1. Field of the Invention

The present invention relates to glass fibers, especially suitable for reinforcing organic materials, and also to the composites formed from the fibers and materials.

2. Description of the Background

The field of glass fibers is a highly specialized part of the glass industry. As preferred reinforcements in the composites industry, glass fibers are characterized especially by their good mechanical properties and their suitability for receiving various coatings or "sizes" enabling a bond to be formed between the glass and the materials to be reinforced. In order to satisfy those criteria, the glass fibers must have a specific composition. In other words, they must be produced from a glass of suitable composition which is capable of being drawn in the form of filaments a few micrometers in diameter to give fibers having the above-mentioned characteristics.

The glass fibers most widely used in the reinforcements industry are fibers having a composition derived from the eutectic composition of the $SiO_2$—$Al_2O_3$—$CaO$ system at 1170° C. Most of them are characterized by a limited content of alkali metal oxides and, in the case of E glass fibers, (as described in U.S. Pat. Nos. 2,334,961 and 2,571,074) by the presence of boric anhydride, $B_2O_3$, replacing some of the silica $SiO_2$. The composition of the latter fibers, which are especially suitable for the production of composites and are used worldwide, is discussed in numerous patents describing compositions for glass fibers which enable higher performance fibers and composite products to be obtained.

Although improvement of the technical and economic characteristics of the fibers and composite products is the main preoccupation in matters of research, it is nevertheless appropriate to note that the aesthetic aspect of the products obtained is also often taken into account, although improvements to this aspect must not be to the detriment of the technical properties of the products. A particular problem in the case of composite products is to obtain composites having a "natural" tint, that is to say, a tint conferred solely by the initial organic material used to produce the composites, without adding coloring substances or pigments. It often happens that upon introduction of sized glass fibers into the organic material, the coloring of the composites obtained is not as desired. This is due to the sized glass fibers having a detrimental effect on the coloring of the materials. As a result, the composites obtained often have yellowish and/or greenish tones which are undesirable and unsatisfactory, especially in the case of composites formed from thermoplastic materials.

SUMMARY OF THE INVENTION

Accordingly, one object of the present invention is provide composite products produced from glass fibers and an organic material, these composite products having a more natural tint in the absence of any constituent other than the glass fibers and the organic material, such a tint being more pleasing and also enabling later changes in color to be effected more readily by the addition of pigments or coloring substances, while the other characteristics and properties of the composites, such as their mechanical properties, remain essentially unchanged.

A further object of the present invention is to provide composite products manufactured from glass fibers, especially E glass fibers, and from an organic material, these composite products having a more natural coloring regardless of the type of organic material used and the processes used to produce the composites, while avoiding complications encountered notably by the addition of a treatment stage, and without impairing the other characteristics and properties of said composites.

These and other objects of the present invention have been satisfied by the discovery of glass fibers for reinforcing organic materials and having an alumino-silicate glass composition, said composition further comprising one or more alkaline earth metal compounds and having a low content of alkali metal compounds, and wherein the composition further comprises a combination of coloring agents of iron oxides, cobalt oxide and, optionally, chromium oxide, said coloring agents providing bulk dyeability to the glass fibers, and the composite products produced therefrom.

DETAILED DESCRIPTION OF THE PREFERRED EMBODIMENTS

The present invention relates to glass fibers, especially E glass fibers, having a more neutral coloring, without impairing their properties, especially their mechanical properties, or interfering with or complicating their manufacture or use. The glass fibers have a more natural coloring and provide to the composite product a more natural coloring regardless of the organic material or process used to prepare the composite product.

The glass fibers of the present invention are characterized by a reduction in certain colorimetric values or indices, these reductions in values applying also to composites formed using the glass fibers and reflecting, in the case of composites, a return to more natural tints.

The glass fibers according to the present invention are fibers preferably intended for reinforcing organic materials and having an alumino-silicate glass composition containing one or more alkaline earth metal compounds, preferably oxides, and with a low content, preferably under 2% by weight, of alkali metal compounds, preferably oxides, and are characterized in that the composition also comprises a combination of coloring agents formed from iron oxides, cobalt oxide and, optionally, chromium oxide. This combination of coloring agents allows the fibers to be bulk dyed.

The term "glass fibers" as used herein includes continuous glass threads, cut glass threads, milled glass threads, as well as woven or non-woven mats, strands, slivers, and meshes, produced using the threads. These glass fibers are obtained in accordance with conventional processes and, while being produced, are coated with a conventional size, the composition of which depends on the ultimate use to which the fibers are put. In accordance with a current process for the manufacture of glass fibers, the glass fibers of the present invention coated with the size are obtained by drawing thin streams of molten glass as sheets of continuous filaments from the molten glass having the composition of the fibers and flowing from the apertures of one or more dies, then coating the filaments with a suitable size before assembling the filaments in one or more threads. The threads are then wound onto rotating supports before undergoing other operations, are distributed on moving conveyors, or are cut after being formed. The exact process is dependent on the actual end use and types of fibers as noted above.

The glass fibers of the present invention have a composition which, apart from the coloring agents defined above, is essentially based on silica, alumina and, in the majority of cases, lime and contains very few (i.e. preferably <2%) alkali metal compounds. This type of composition is specific and especially suited to the glass fiber field, especially glass fibers for reinforcing organic materials. In the majority of cases, the basic composition of the glass fibers of the present invention also comprises boric anhydride and preferably corresponds to that of an E glass, which is the most widely used glass in the glass fiber industry. The basic composition of the E glass fibers according to the present invention, (i.e., the constituents other than the coloring agents) comprises, within the indicated weight limits, the following constituents:

| | |
|---|---|
| $SiO_2$ | 52 to 58% |
| $Al_2O_3$ | 12 to 16% |
| CaO | 16 to 25% |
| $B_2O_3$ | 4 to 13% |
| MgO | 0 to 6% |
| alkali metal oxides (essentially $Na_2O + K_2O$) | 0 to 2% |

The basic composition of the present glass fibers may be produced from pure raw materials but, in industry, will be produced from natural raw materials which may contain impurities such as titanium oxide. The proportion of titanium oxide in the present glass fibers must not exceed 1%. Equally, other compounds may be found in the composition of the present glass fibers, such as sulfuric acid anhydride, resulting from the decomposition of the sodium sulphate or calcium sulphate which is introduced in production to facilitate the melting of the glass and to refine and oxidize the glass. The proportion of sulfuric acid anhydride should never exceed 0.4%. It is also possible to add to the composition of the present fibers up to 1% of fluorine to facilitate the melting of the glass or, in proportions lower than 0.1% by weight, compounds such as copper oxide (to improve the glass's resistance to abrasion), barium oxide, zinc oxide or zirconium oxide. Lithium oxide may also be present in an amount less than 0.5% by weight among the alkali metal oxides used.

The present glass fibers are characterized by the presence of a combination of coloring agents. The coloring agents do not modify the main physical properties of the fibers, such as the mechanical characteristics. The coloring agents used include iron oxides, originating at least in part from the raw materials used in the industry in which they are often found as impurities. Their proportion in the composition of the present glass fibers is in most cases greater than 0.05% by weight and never exceeds 0.5% by weight. Preferably, the content of iron oxides is less than or equal to 0.4% by weight, which corresponds to the upper limit of the content of iron oxides in nearly all the E glasses currently used, and to a preferred limit in order to obtain, in combination with the other coloring agents used in the invention, glass fibers enabling especially satisfactory composites to be obtained.

The content of iron oxides in the composition of the present glass fibers is most preferably on the order of 0.2% by weight, as later illustrated in the Examples.

It should be noted that the present glass fibers are preferably fibers of oxidized glass having a composition in which less than 40% and, most preferably less than 35%, by weight of the iron oxides present are in the form of ferrous oxides. Beyond that limit, the production of fibers using traditional methods and devices becomes more difficult and the mechanical characteristics of the fibers obtained may prove to be less satisfactory. The glass forming the present glass fibers is therefore preferably an oxidized glass.

The present glass fibers also contain, in combination with the iron oxides, cobalt oxide. Unlike the iron oxides, which may originate in part from the raw materials used, cobalt oxide is mostly deliberately added to the composition of the present glass fibers. The addition of cobalt oxide is critical in obtaining the desired composites of the present invention. Preferably, the content of cobalt oxide in the composition is greater than 10 ppm and, most preferably greater than 30 ppm. In addition, that content preferably does not exceed 150 ppm and, most preferably does not exceed 100 ppm, since a greater proportion of cobalt oxide causes a significant reduction in the luminance of the glass fibers obtained.

According to a preferred embodiment of the present invention, the ratio of the content of cobalt oxide to the content of iron oxides in the composition of the present glass fibers is greater than 1.25%. Thus, for an iron oxide content of 0.2% by weight in the composition, the cobalt oxide content of the composition is preferably greater than 25 ppm. Likewise, for an iron oxide content of 0.4% by weight in the composition, the cobalt oxide content of said composition is preferably greater than 50 ppm. Adherence to the above ratio provides particularly satisfactory fibers and composites according to the present invention.

In addition to cobalt oxide and the iron oxides, the composition of the present glass fibers may also comprise chromium oxide. The chromium oxide may be introduced into the original composition of the glass used to produce the fibers and/or may originate from the furnace used for melting the glass before drawing to give the fibers. In order to obtain the present fibers, the content of chromium oxide in the composition does not exceed 250 ppm, preferably does not exceed 200 ppm.

The fibers according to the present invention have a more neutral coloring which may be characterized using calorimetric coordinates identified by the letters $a^*$, $b^*$ and $L^*$, with $a^*$ and $b^*$ characterizing the chromaticity of the glass and $L^*$ characterizing the luminance of the glass. The coordinates in question are derived from the trichromatic coordinates X, Y and Z, defined and proposed in 1931 by the Commission Internationale de l'Éclairage (CIE) [International Commission on Illumination (ICI)], which is recognized worldwide as the authority in matters of colorimetry. The $L^*$, $a^*$, $b^*$ coordinate system, commonly referred to as CIELAB, was the subject of an official CIE recommendation in 1976 (Commission Internationale de l'Éclairage, Colorimetry Recommandations Officielles—CIE Publication No. 15–2, Vienna, 1986) and is used by a large number of industrial sectors.

The measurement of the colorimetric coordinates $L^*$, $a^*$, $b^*$ is carried out first of all on the glass from which the glass fibers are obtained, that glass having the same composition as the glass fibers and being melted in a furnace in a non-reductive atmosphere, then cast to give pressed plates. The transmission measurements effected in order to determine the $a^*$, $b^*$ and $L^*$ values of the glass mass obtained are carried out using a Perkin-Elmer Lambda 9 spectrometer, under illuminant D 65.

Such glass, when having a minimum content of cobalt oxide of 30 ppm, and a content of iron oxides and chromium oxide not exceeding 0.4% by weight and 200 ppm, respectively, is characterized by a reduction of at least 25% in the value of the $b^*$ measured compared with the value of $b^*$ measured on the same thickness using a glass without cobalt oxide, the respective values of a* for their part varying relatively little and in a non-significant manner and the two glasses having, except for the cobalt oxide, the same composition for an identical degree of oxidation.

The reduction in the value of the measured b* of the present glass without any significant variation in a*, compared with a glass having the same composition, the same degree of oxidation and the same thickness but without cobalt oxide, is at least 40% where the cobalt oxide content of the present glass is at least 50 ppm, the content of iron oxides and the content of chromium oxide not exceeding 0.4% by weight and 200 ppm, respectively, and/or where the minimum cobalt oxide content is 30 ppm and where the ratio of the content of cobalt oxide to the content of iron oxides in the composition of the present glass is greater than 1.25%, the content of iron oxides and the content of chromium oxide not exceeding 0.4% by weight and 200 ppm, respectively. The reduction in the value of the measured b*, without any significant change in the value of a*, also increases with the amount of cobalt oxide added and reflects a development towards more neutral tones in the coloring of the glass from which the fibers are produced. This development towards more neutral coloring is found in the glass fibers and consequently gives rise to a development towards more natural tints in the composites formed from the fibers.

The measurement of the calorimetric coordinates can also be carried out directly on the fibers and corroborates the above statements. The measurement on the fibers is effected by reflection, using an ACS chroma-sensor CS-3 spectrophotometer having a 45°/0° geometry of analysis that enables specular reflection to be eliminated, 45° corresponding to the direction of illumination in relation to the perpendicular to the surface of the sample and 0° corresponding to the direction of observation in relation to the perpendicular, and measurement being effected under illuminant D 65.

The glass fibers according to the present invention are characterized, for a minimum cobalt content of 30 ppm and for a content of iron oxides and a content of chromium oxide not exceeding 0.4% by weight and 200 ppm, respectively, by a reduction of at least 20% in the value of the measured b* compared with the value of the measured b* in the case of glass fibers without cobalt oxide and coated with the same size, the respective values of a* for their part varying relatively little and in a non-significant manner and the above-mentioned fibers having, except for the cobalt oxide, the same composition for an identical degree of oxidation.

The reduction in the value of the measured b* of the glass fibers is at least 30% where the content of cobalt oxide in the fibers according to the invention is at least 50 ppm, the content of iron oxides and the content of chromium oxide not exceeding 0.4% by weight and 200 ppm, respectively, and/or where the minimum content of cobalt oxide is 30 ppm and where the ratio of the content of cobalt oxide to the content of iron oxides in the composition of the fibers is greater than 1.25%, the content of iron oxides and the content of chromium oxide not exceeding 0.4% by weight and 200 ppm, respectively. The reduction in the value of the measured b*, without any significant change in the value of a*, also increases with the amount of cobalt oxide added, as already observed with the glass from which the fibers are produced.

It is also possible to characterize the present glass fibers by measuring the yellow index of the fibers. The yellow index is calculated in the same manner as the yellow index according to the ASTM standard D 1925–70 and is dependent on the L*, a*, b* coordinates obtained on fibers. The measurements are carried out in reflection using the same spectrophotometer as previously used for determining the L*, a*, b* coordinates of the fibers, but under illuminant C. The yellow index enables the coloring of the fibers to be evaluated more comprehensively, at the same time taking into account the chromaticity of the fibers obtained and their luminosity. Although the fibers according to the invention and the glasses from which they are obtained have a* and b* values characterizing their chromaticity and reflecting their development towards more neutral tints, it should be noted that the values of the luminosity index L* for the fibers and glasses mentioned above are generally lower than the L* values obtained for fibers and glasses that are identical therewith except for the cobalt oxide, which reflects a certain opacification of the present fibers and glasses. However, the observation of the yellow index, which enables those values to be considered as a whole and enables the coloring of the fibers to be assessed, demonstrates the development of the coloring of the fibers towards the desired more neutral tones.

For a content of cobalt oxide in the fiber composition greater than 50 ppm and/or for a content of cobalt oxide greater than 30 ppm, with a ratio of the content of cobalt oxide to the content of iron oxides greater than 1.25%, the content of cobalt oxide, iron oxides and chromium oxide not exceeding in either case 150 ppm, 0.4% by weight and 200 ppm, respectively, the yellow index of the fibers according to the invention is at least 20% lower than the yellow index of glass fibers having an identical composition except for the cobalt oxide, this difference increasing with the amount of cobalt oxide present in the fibers. The reduction in the yellow index of the present glass fibers brings about a reduction in the yellow index of the composites obtained from the fibers, as indicated below.

The glass fibers of the present invention are preferably used to reinforce organic materials in order to produce composites, especially natural composites, in accordance with conventional processes. The composites produced from the glass fibers according to the invention have a reduced b* value and a reduced yellow index according to the ASTM standard D 1925—70, which reflects a development of the composites towards more natural tints. The b* value and the yellow index of the composites obtained are calculated from reflection measurements on composites using the same spectrophotometer as discussed above for the glass fibers, under illuminant D 65 for the b* value and under illuminant C for the yellow index.

The composites produced from the present glass fibers according to the invention have a yellow index and a b* value that are lower by at least 10%, respectively, than the yellow index and the b* value of composites produced in the same manner from fibers that are identical except for the cobalt oxide and are coated with the same size, when the glass fibers according to the invention, which are in the composite, have a content of cobalt oxide greater than 50 ppm and/or a content of cobalt oxide greater than 30 ppm, with a ratio of the content of cobalt oxide to the content of iron oxides greater than 1.25%, the content of cobalt oxide, iron oxides and chromium oxide not exceeding in either case 150 ppm, 0.4% by weight and 200 ppm, respectively. This difference in yellow index and b* value increases with the amount of cobalt oxide present in the fibers. It should also be noted that the other properties of the composites, such as the mechanical properties, remain unchanged compared with those of composites obtained using conventional fibers.

The glass fibers according to the present invention can be used in several applications, including the production of composites, and the composites according to the invention can be used to produce different components having good mechanical properties in fields as diverse as the car industry, domestic appliances, and the tool industry.

Having generally described this invention, a further understanding can be obtained by reference to certain specific examples which are provided herein for purposes of illustration only and are not intended to be limiting unless otherwise specified.

EXAMPLES

Examples 1 to 14 illustrate the results obtained by measuring the colorimetric coordinates L*, a* and b* on glasses en masse having various compositions of the glass fibers within the embodiments of the present invention, compared with glasses en masse having the same compositions, except for the cobalt oxide coloring agent. The basic composition of the different glasses is the following, expressed in percentages by weight:

| | |
|---|---|
| $SiO_2$ | 54.6% |
| $Al_2O_3$ | 14.0% |
| CaO + MgO | 23.5% |
| $Na_2O + K_2O$ | 0.6% |
| $B_2O_3$ | 6.5% |
| $SO_3$ | 0.4% |

The coloring agents added to this basic composition in each Example are indicated in their respective proportions by weight in Table I. (The composition listed is completed, if necessary, with silica in order to give a total of 100%). Table I gives the values of the calorimetric coordinates a*, b* and L* obtained in each Example and also the redox ratio of the glasses of each Example, the redox ratio corresponding to the ratio of the iron oxides present in the form of ferrous oxides to all of the iron oxides present, this ratio being modified by a multiplying factor of 1.11. The table also indicates the values obtained for the dominant wavelengths (dw) for each glass.

The colorimetric coordinates of each glass were measured in the following manner: each glass was melted in a heating-element-furnace enabling glasses having a low redox ratio to be obtained. Each glass was then refined and cast to give a pressed plate 3.85 mm thick. The transmission measurements made in order to determine the a*, b* and L* values were carried out using a Perkin-Elmer Lambda 9 spectrometer, under illuminant D 65. The glasses constituting the fibers of the present invention (glasses 2 to 5, 7 to 9 and 11 to 14) exhibited a lower b* value than the glasses that had the same composition, except for the cobalt oxide, and substantially the same degree of oxidation (glasses 1, 6 and 10), with the respective a* values varying relatively little and in a non-significant manner.

In Examples 15 to 19, the same measurements as those carried out in Examples 1 to 14 were carried out on glasses en masse having the following basic composition:

| | |
|---|---|
| $SiO_2$ | 56.0% |
| $Al_2O_3$ | 13.0% |
| CaO + MgO | 23.3% |
| $B_2O_3$ | 6.0% |
| $Na_2O + K_2O$ | 0.9% |

The coloring agents added to this basic composition in each Example are indicated in their respective proportions by weight in Table II and the composition was completed, if necessary, with silica in order to give a total of 100%.

Examples 20 to 24, shown in Table III, illustrate the results obtained by reflection measurement, using an ACS chroma-sensor CS-3 spectrophotometer with a 45°/0° geometry of analysis, under illuminant D 65, of the calorimetric coordinates L*, a*, b* and, under illuminant C, of the yellow index, YI, of the glass fibers produced, respectively, from the glasses illustrated in Examples 15 to 19, these glass fibers all being coated with the same size and being obtained in accordance with the same process. The results obtained show that the fibers according to the present invention (fibers 21, 22 and 24) exhibited a b* value and a yellow index that were lower than those of glass fibers that had the same composition, except for the cobalt oxide and the same degree of oxidation and were coated with the same size (fibers 20 and 23).

Examples 25 to 28, shown in Table IV, illustrate the results obtained by reflection measurement, using an ACS chroma-sensor CS-3 spectrophotometer with a 45°/0° geometry of analysis, under illuminant D 65, of the colorimetric coordinates L*, a*, b* and, under illuminant C, of the yellow index, YI, of the composites formed, respectively, from the fibers illustrated in Examples 20, 22, 23 and 24, these composites all being obtained in accordance with the same process and being measured on a thickness of 4 mm. The composites were made of a polyamide 6.6 thermoplastic material, marketed under the name Technyl A 216 by Rhône-Poulenc, and had a glass fiber content of 30%. The measurements were carried out on composite plates formed by extrusion/injection. Table IV also indicates the values of the dominant wavelengths, dw, for each glass.

In Examples 29 to 32, the same measurements as effected above in Examples 25 to 28 were effected on composites 8 mm thick formed from a polypropylene thermoplastic material marketed under the name Appryl 3030 MN1 by Appryl and on composites 8 mm thick produced from a butylene polyterephthalate thermoplastic material marketed under the name Crastine LMC 55 by E. I. Du Pont de Nemours, the composites comprising, according to the Examples, 30% glass fibers illustrated in Example 23 or 30% glass fibers illustrated in Example 24. The results obtained are provided in Table TV.

The results obtained in Examples 25 to 33 show that the composites according to the invention (composites 26, 28, 30 and 32) had a lower b* value and a lower yellow index than the composites produced from fibers that were identical except for the cobalt oxide and coated with the same size, for an identical glass fiber content and the same reinforced organic material (composites 25, 27, 29 and 31).

TABLE I

| | $Fe_2O_3$ (% by weight) | CoO (ppm) | $Cr_2O_3$ | Ré-dox | L* | a* | b* | dw (nm) |
|---|---|---|---|---|---|---|---|---|
| Glass 1 | 0.20 | 0 | 0 | 0.25 | 94.1 | −2.3 | 3.1 | 563 |
| Glass 2 | 0.20 | 25 | 0 | 0.25 | 92.4 | −2.2 | 1.2 | 534 |
| Glass 3 | 0.20 | 50 | 0 | 0.26 | 90.2 | −2.0 | −1.1 | 489 |
| Glass 4 | 0.35 | 100 | 0 | 0.25 | 87.1 | −1.7 | −4.9 | 482 |
| Glass 5 | 0.35 | 30 | 50 | 0.24 | 91.5 | −3.2 | 1.8 | 538 |
| Glass 6 | 0.40 | 0 | 50 | 0.27 | 90.6 | −4.8 | 6.7 | 564 |
| Glass 7 | 0.40 | 25 | 50 | 0.27 | 89.2 | −4.8 | 5.0 | 559 |
| Glass 8 | 0.40 | 50 | 50 | 0.27 | 86.9 | −4.5 | 3.2 | 548 |
| Glass 9 | 0.40 | 100 | 50 | 0.27 | 84.2 | −4.2 | −0.2 | 496 |
| Glass 10 | 0.40 | 0 | 100 | 0.27 | 89.2 | −6.1 | 8.1 | 563 |
| Glass 11 | 0.40 | 50 | 100 | 0.26 | 87.1 | −5.7 | 4.3 | 550 |
| Glass 12 | 0.40 | 100 | 100 | 0.27 | 83.6 | −5.7 | 0.9 | 503 |

TABLE I-continued

| | Fe₂O₃ (% by weight) | CoO (ppm) | Cr₂O₃ | Ré-dox | L* | a* | b* | dw (nm) |
|---|---|---|---|---|---|---|---|---|
| Glass 13 | 0.40 | 100 | 150 | 0.27 | 82.7 | −6.6 | 1.9 | 510 |
| Glass 14 | 0.40 | 100 | 200 | 0.25 | 82.7 | −7.5 | 2.7 | 516 |

TABLE II

| | Fe₂O₃ (% by weight) | CoO (ppm) | Cr₂O₃ | Ré-dox | L* | a* | b* | dw (nm) |
|---|---|---|---|---|---|---|---|---|
| Glass 15 | 0.20 | 0 | 0 | 0.25 | 93.4 | −3.4 | 3.9 | 561 |
| Glass 16 | 0.20 | 30 | 100 | 0.25 | 91.5 | −3.3 | 1.8 | 538 |
| Glass 17 | 0.20 | 50 | 100 | 0.25 | 89.6 | −3.1 | 1.6 | 490 |
| Glass 18 | 0.35 | 0 | 100 | 0.25 | 90.6 | −4.8 | 6.7 | 564 |
| Glass 19 | 0.35 | 50 | 100 | 0.25 | 86.9 | −4.5 | 3.2 | 548 |

TABLE III

| | Glass Constituting the Fibers | L* | a* | b* | YI |
|---|---|---|---|---|---|
| Fibers 20 | Glass 15 | 85.8 | −2.9 | 4.1 | 12.9 |
| Fibers 21 | Glass 16 | 84.8 | −2.6 | 2.5 | 10.2 |
| Fibers 22 | Glass 17 | 84.8 | −2.4 | 1.8 | 9.0 |
| Fibers 23 | Glass 18 | 82.7 | −3.0 | 4.7 | 14.0 |
| Fibers 24 | Glass 19 | 82.2 | −2.8 | 3.0 | 11.2 |

TABLE IV

| | Thermoplastics Material Used | Fibers Used | L* | a* | b* | YI | dw (nm) |
|---|---|---|---|---|---|---|---|
| Composite 25 | Polyamide 6.6 | Fibers 20 | 76.2 | −3.4 | 11.6 | 22.6 | 572 |
| Composite 26 | Polyamide 6.6 | Fibers 22 | 74.8 | −3.8 | 9.8 | 18.7 | 570 |
| Composite 27 | Polyamide 6.6 | Fibers 23 | 75.2 | −3.2 | 12.4 | 24.6 | 573 |
| Composite 28 | Polyamide 6.6 | Fibers 24 | 73.2 | −3.3 | 10.9 | 21.8 | 572 |
| Composite 29 | Polypropylene | Fibers 23 | 82.8 | −3.3 | 11.0 | 20.1 | 572 |
| Composite 30 | Polypropylene | Fibers 24 | 82.4 | −3.4 | 8.3 | 14.8 | 570 |
| Composite 31 | Butylene polyterephthalate | Fibers 23 | 86.3 | −1.9 | 9.3 | 17.5 | 574 |
| Composite 32 | Butylene polyterephthalate | Fibers 24 | 84.7 | −2.1 | 8.1 | 15.2 | 573 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Glass fiber for reinforcing organic materials and having an alumino-silicate glass composition, said composition further comprising one or more alkaline earth metal compounds and having less than 2% by weight of alkali metal oxides, and wherein the composition further comprises a combination of coloring agents of iron oxides, cobalt oxide and, optionally, chromium oxide, said coloring agents providing bulk dyeability to the glass fibers, and said glass composition is an oxidized glass composition.

2. The glass fiber according to claim 1, wherein said alkaline earth metal compound is lime.

3. The glass fiber according to claim 2, wherein the composition further comprises boric anhydride.

4. The glass fiber according to claim 3, wherein the composition comprises, apart from the coloring agents, the following constituents within the indicated weight limits:

| | |
|---|---|
| SiO₂ | 52 to 58% |
| Al₂O₃ | 12 to 16% |
| CaO | 16 to 25% |
| B₂O₃ | 4 to 13% |
| MgO | 0 to 6% |
| alkali metal oxides | 0 to 2%. |

5. The glass fiber according to claim 1, wherein said iron oxides contain a maximum of 40% by weight of ferrous oxides.

6. The glass fiber according to claim 1, wherein iron oxides are present in an amount of less than 0.5% by weight, chromium oxide is present in an amount of less than 250 ppm and cobalt oxide is present in an amount of less than 150 ppm.

7. The glass fiber according to claim 6, wherein the iron oxides and chromium oxide are present in the composition in amounts of less than 0.4% by weight and 200 ppm, respectively.

8. The glass fiber according to claim 7, wherein cobalt oxide is present in an amount greater than 30 ppm.

9. The glass fiber according to claim 8, wherein the fiber is obtained from a glass having the same composition as that of the fiber and wherein said glass has a b* value which is lower by at least 25% than a b* value, obtained for an identical glass without cobalt oxide.

10. The glass fiber according to claim 8, wherein the fiber has a b* value that is lower by at least 20% than a b* value obtained for a fiber of identical composition, with the exception of an absence of cobalt oxide.

11. The glass fiber according to claim 8, wherein cobalt oxide is present in the composition in an amount of greater than 50 ppm.

12. The glass fiber according to claim 8, wherein the composition has a weight ratio of cobalt oxide to iron oxides greater than 0.0125%.

13. The glass fiber according to claim 11, wherein the fiber is obtained from a glass having a composition which is the same as the fiber and the glass has a b* value that is lower by at least 40% than a b* value obtained for an identical glass without cobalt oxide.

14. The glass fiber according to claim 11 wherein the glass fiber has a b* value that is lower by at least 30% than a b* value obtained for a fiber that is identical in composition, with the exception of the absence of cobalt oxide.

15. The glass fiber according to claim 11, wherein the fiber has a yellow index that is lower by at least 20% than a yellow index obtained for a fiber that is identical in composition with the exception of the absence of cobalt oxide.

16. A composite comprising at least one organic material reinforced with glass fibers, wherein said glass fibers have an alumino-silicate glass composition, said composition further comprising one or more alkaline earth metal compounds and having less than 2% by weight of alkaline metal oxides, and wherein the composition further comprises a combination of coloring agents of iron oxides, cobalt oxide and, optionally, chromium oxide, said coloring agents providing bulk dyeability to the glass fibers, and said glass composition is an oxidized glass composition.

17. The composite according to claim 16, wherein said iron oxides are present in an amount of less than 0.4% by weight, and said chromium oxides are present in an amount of less than 200 ppm, said cobalt oxide is present in the composition in an amount of greater than 50 ppm, and wherein the composite has a b* value and a yellow index that are lower by at least 10%, respectively than a b* value and a yellow index obtained for a composite comprising an identical organic material reinforced by glass fibers that are identical in composition, with the exception of the absence of cobalt oxide.

18. The glass fiber according to claim 12, wherein the glass fiber has a b* value that is lower by at least 30% than a b* value obtained for a fiber that is identical in composition, with the exception of the absence of cobalt oxide.

19. The glass fiber according to claim 12, wherein the fiber has a yellow index that is lower by at least 20% than a yellow index obtained for a fiber that is identical in composition with the exception of the absence of cobalt oxide.

20. The glass fiber according to claim 12, wherein the fiber is obtained from a glass having a composition which is the same as the fiber and the glass has a b* value that is lower by at least 40% than a b* value obtained for an identical glass without cobalt oxide.

21. The composite according to claim 16, wherein said iron oxides are present in an amount of less than 0.4% by weight, and said chromium oxides are present in an amount of less than 200 ppm, said cobalt oxide is present in the composition in an amount of greater than 30 ppm, the composition has a weight ratio of cobalt oxide to iron oxides greater than 0.0125%, and wherein the composite has a b* value and a yellow index that are lower by at least 10%, respectively than a b* value and a yellow index obtained for a composite comprising an identical organic material reinforced by glass fibers that are identical in composition, with the exception of the absence of cobalt oxide.

22. The glass fiber according to claim 1, wherein said alumino-silicate glass composition comprises the following constituents within the indicated weight limits:

| | |
|---|---|
| $SiO_2$ | 52 to 58% |
| $Al_2O_3$ | 12 to 16% |
| CaO | 16 to 25% |
| $B_2O_3$ | 4 to 13% |
| MgO | 0 to 6% |
| alkali metal oxides | 6 to 2% | and wherein said cobalt oxide is present in an amount of from 10 to 150 ppm.

23. Glass fiber for reinforcing organic materials and having an alumino-silicate glass composition, said composition further comprising one or more alkaline earth metal compounds and having less than 2% by weight of alkali metal oxides, and wherein the composition further comprises a combination of coloring agents of iron oxides, cobalt oxide and, optionally, chromium oxide, said coloring agents providing bulk dyeability to the glass fibers, and wherein said iron oxides contain a maximum of 40% by weight of ferrous oxides.

24. A composite comprising at least one organic material reinforced with glass fibers, wherein said glass fibers have an alumino-silicate glass composition, said composition further comprising one or more alkaline earth metal compounds and having less than 2% by weight of alkaline metal oxides, and wherein the composition further comprises a combination of coloring agents of iron oxides, cobalt oxide and, optionally, chromium oxide, said coloring agents providing bulk dyeability to the glass fibers, and wherein said iron oxides contain a maximum of 40% by weight of ferrous oxides.

25. The glass fiber according to claim 1, wherein said cobalt oxide is present in an amount greater than 10 ppm.

26. The glass fiber according to claim 17, wherein said cobalt oxide is present in an amount greater than 10 ppm.

* * * * *